United States Patent [19]
Dietrich et al.

[11] 3,771,011
[45] Nov. 6, 1973

[54] APPARATUS FOR SWITCHING INPUTS TO A DEFLECTION SYSTEM

[75] Inventors: Arnold K. Dietrich, Binghamton; William H. Nott, Kirkwood, both of N.Y.

[73] Assignee: The Singer Company, Binghamton, N.Y.

[22] Filed: Feb. 4, 1972

[21] Appl. No.: 223,609

[52] U.S. Cl. .................. 315/26
[51] Int. Cl. .................. H01j 29/70
[58] Field of Search .................. 315/25, 26, 20, 18, 315/19

[56] References Cited

UNITED STATES PATENTS 3,599,034 8/1971 Fischer .................. 315/26
3,609,444 9/1971 Heuvel .................. 315/26

*Primary Examiner*—Carl D. Quarforth
*Assistant Examiner*—J. M. Potenza
*Attorney*—Francis L. Masselle et al.

[57] ABSTRACT

A system for applying scan voltages to and removing said voltages from high power deflection amplifiers in a manner which avoids overloading and damage to the amplifier is shown. Means are provided to detect a zero cross-over and to switch on or off only at or near that point using a switch comprising a diode bridge in series with two transistors controlled by a third transistor which is responsive to the cross-over means.

10 Claims, 3 Drawing Figures

APPARATUS FOR SWITCHING INPUTS TO A DEFLECTION SYSTEM

This invention relates to television displays in general and more particularly to an improved system for applying horizontal and vertical drive voltages to deflection amplifiers.

In a typical deflection system horizontal and vertical drive signals are converted by deflection amplifiers to the yoke currents needed to scan a raster on the display. If a high voltage is applied to a deflection amplifier which formerly had no voltage at the input and hence no current output, the current will increase rapidly and a high voltage equal to $L di/dt$ will be generated which will cause breakdown of the drive transistors in the amplifier. Thus, in conventional monitors and television receivers, voltages are brought up to operating levels gradually to avoid this problem. For a single display this works well. But in certain systems such as those described in applications Ser. Nos. 67,385 and 112,924, filed by F. W. McGlasson on Aug. 27, 1970 and Feb. 5, 1971, respectively and assigned to the same assignee as the present invention, a large number of displays are in use. The drive voltages are generated in separate units and it is difficult to provide means to bring the whole system up gradually. Thus to avoid problems of damaging amplifiers and to permit individual displays to be turned on and off for maintenance purposes means are needed to insure that the drive voltages are switched on to the display deflection amplifiers only when at zero volts.

The present system fills this need by providing circuits that insure that, no matter when the voltage is switched on or off, it will be applied to the amplifier only when the voltage is crossing zero.

It is the principle object of this invention to provide a means of applying a drive voltage to a deflection amplifier only when that voltage is at zero.

Another object is to provide such a means which has fast response.

A further object is to provide such a means which may be computer controlled.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
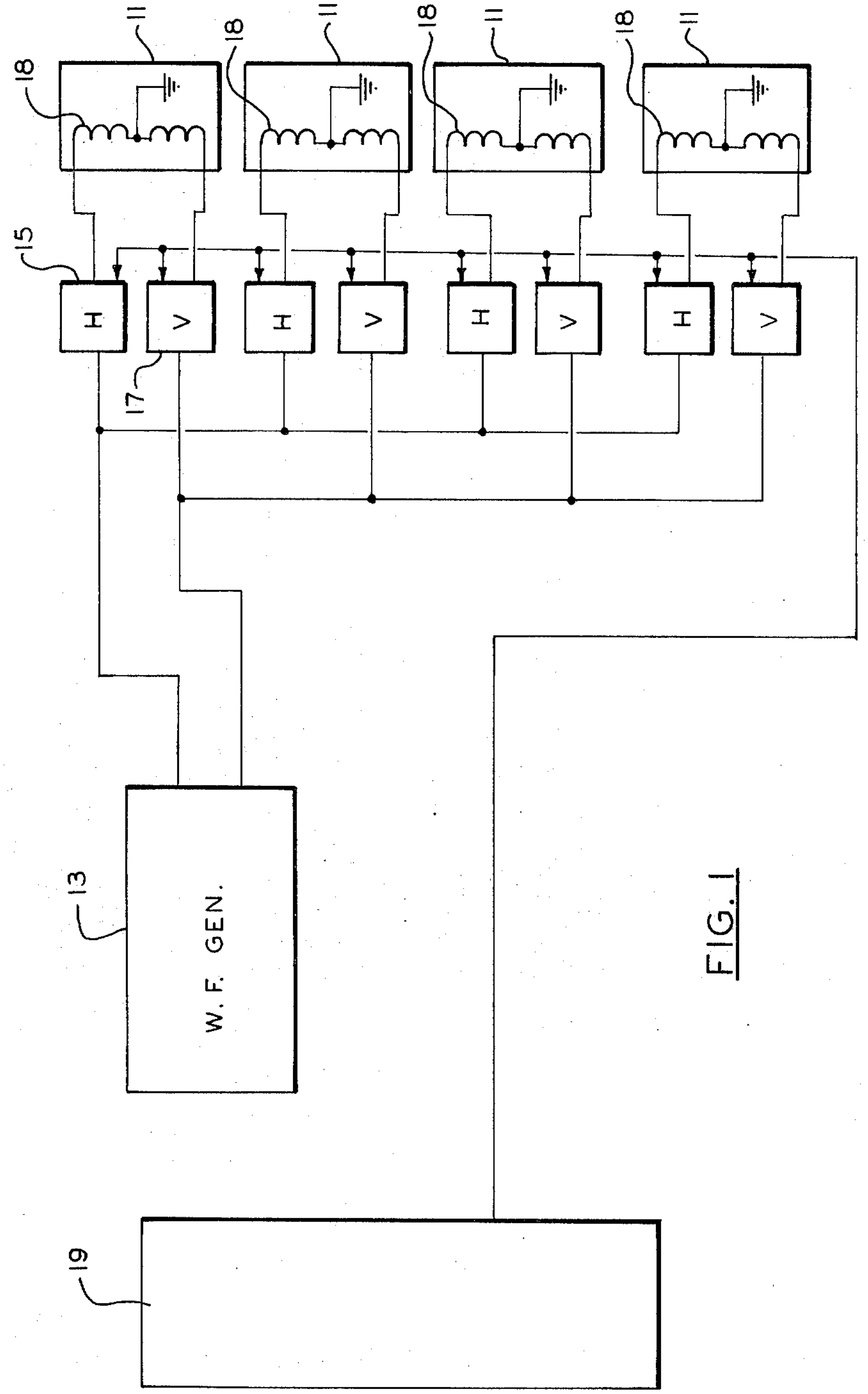
FIG. 1 is a block diagram of the type of display system in which the present invention may be used.

FIG. 1 is a block diagram of a display system with four displays 11. A waveform generator 13 provides horizontal and vertical scan signals to the horizontal deflection amplifiers 15 and vertical deflection amplifiers 17 which provide the yoke currents to displays 11. Turn on commands are supplied to the amplifiers 15 and 17 by block 19 which may be a control panel or digital computer.

Figure 2:
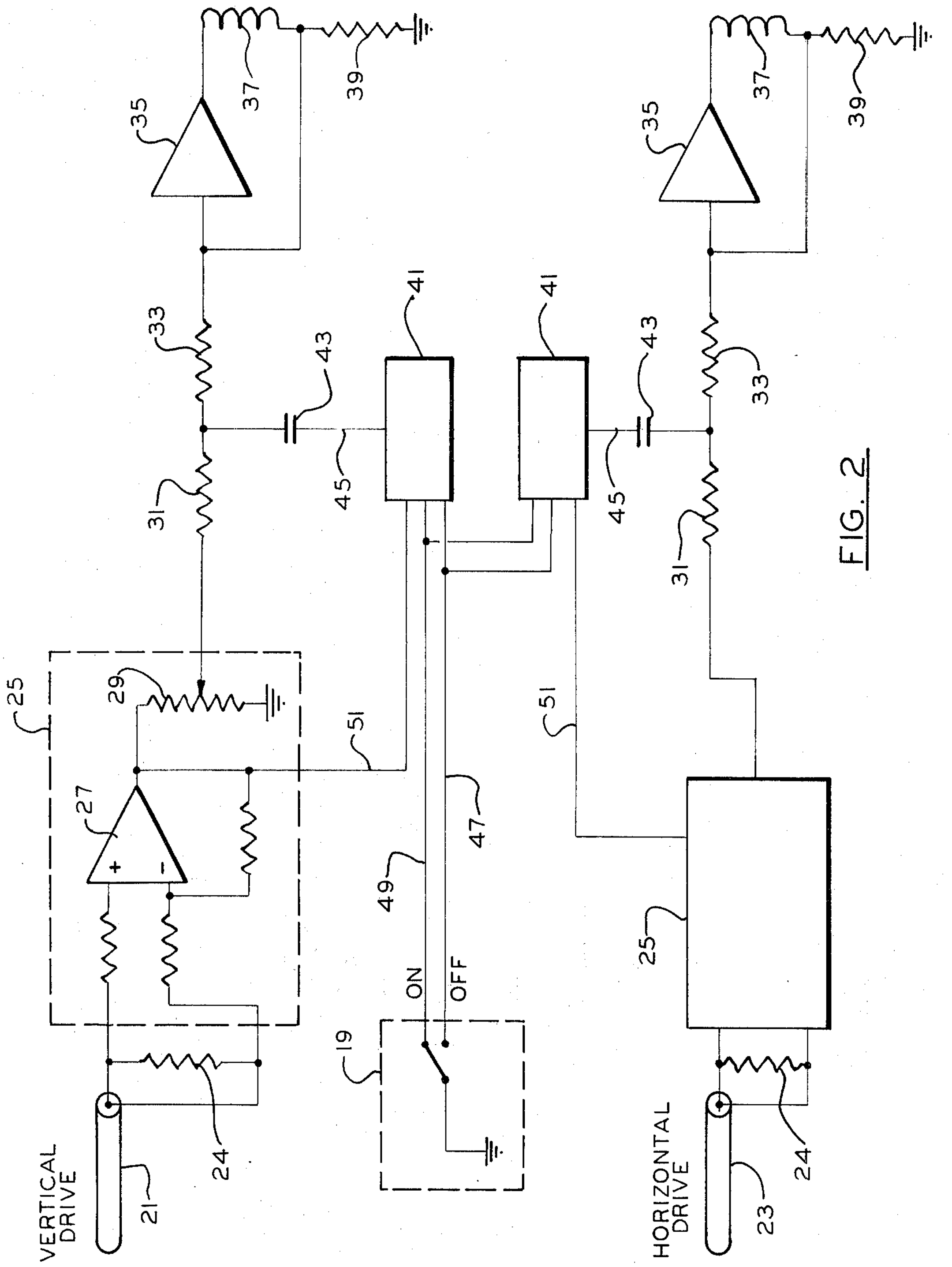
FIG. 2 is a block-circuit diagram of the deflection system for a single display.

FIG. 2 shows the deflection circuits for a single display with the vertical sweep circuits shown in detail. The vertical and horizontal scans are supplied respectively on lines 21 and 23 to line receivers 25 comprising a differential amplifier 27 with a gain potentiometer 29 on its output. This isolates the input and provides common mode rejection. Termination resistors 24 are provided to match the impedance of lines 21 and 23. The output of each receiver 25 is provided through resistors 31 and 33 to the deflection amplifiers 35 which drive the yokes 37. Each amplifier has in its output circuit a current sensing resistor 39 with feedback to the summing junction at the input to provide a closed loop system.

Each amplifier has associated with it a switch 51 to be explained in detail below in connection with FIG. 3. The junction of resistors 31 and 33 is connected to switch 41 through a capacitor 43. Capacitor 43 is selected to provide essentially a short circuit at the vertical or horizontal frequency involved. Thus it will short the drive signal while still providing DC isolation between amplifier 35 and switch 41. Switch 41 is designed to provide a ground on line 45 when there is an off command from block 19 represented by a ground or line 47 and an open when there is an on command (a ground on line 49). An on or off command may be supplied at any time with the signal on line 51 assuring that switching occurs only on zero crossover as will be described below. Thus, when off, line 45 will be at ground with the total voltage drop across resistor 31. When on, the voltage will be provided through resistors 31 and 33 to amplifier 35.

Figure 3:
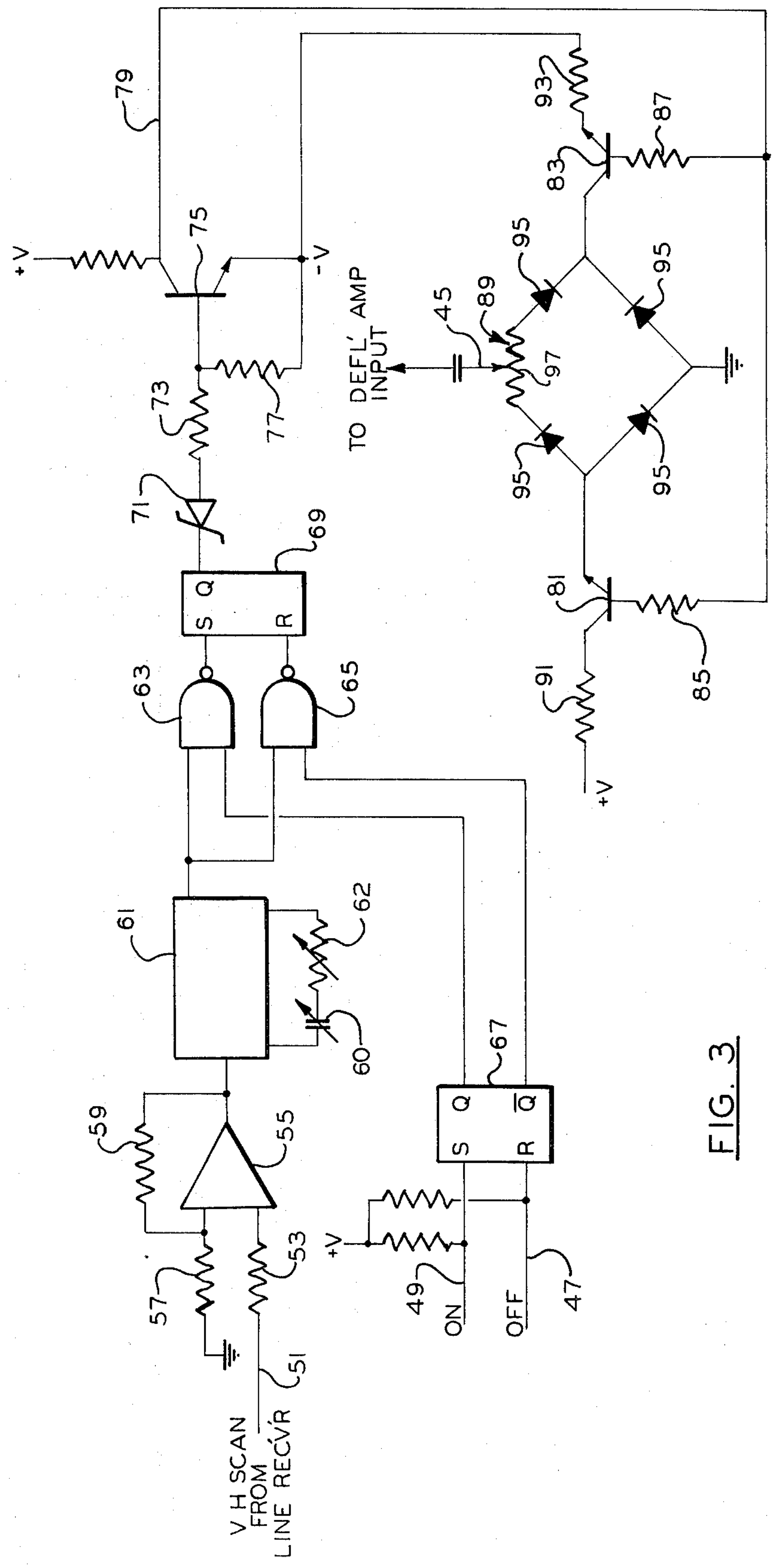
FIG. 3 is a circuit-logic diagram of the switching device of FIG. 2.

The switch 41 is shown on FIG. 3. The scan voltage is provided on line 51 through an input resistor 53 to a comparator 55 which will have an output when the input is greater than zero since its other input is tied to ground through resistor 57. A small amount of positive feedback is provided via resistor 59 to prevent turn off from small oscillations once an output occurs. The output of comparator 55 triggers a one shot multivibrator 61 which is set to provide a pulse which is very short. One shot 61 may be any of the commercially available units having external connections for controlling the pulse width. Connected to one shot 61 are a variable resistor 62 and a variable capacitor 60 which may be used to vary the pulse width. The output of one shot 61 is one input to a Nand gate 63 and to a Nand gate 65. These gates have as their second inputs respectively the Q and $\bar{Q}$ outputs of a flip flop 67, a set reset flip flop. A ground on line 49 will set flip flop 67 and a ground on line 47 will reset it. Assume the deflection amplifier was on and is now turned off. Flip flop 67 will be reset and gate 65 will have one input present enabling it. The next time a zero crossover is detected the output of gate 65 will go from a logic one to logic zero and will reset a flip flop 69. Similarly if the amplifier was off and then turned on, flip flop 67 would be set enabling gate 63 and on the next crossover flip flop 69 would be set. TTL logic should be used to minimize propagation delay. The delay in the circuits shown will be less than 30 ns.

The output of flip flop 69 is provided through a zener diode 71 and resistor 73 which provide level shifting, to the base of transistor inverter 75, which is biased by resistor 77. Transistor 75 will be turned on when flip flop 69 is set and turned off when it is reset. It will provide a positive voltage on line 79, the collector output, when off and a negative voltage when on. This output is provided to the bases of two transistors 81 and 83, through resistors 85 and 87. The transistors 81 and 83 have connected in series between them a bridge 89. Transistor 81 has its collector connected to a positive voltage through resistor 91 and its emitter to one side of bridge 89. Transistor 83 has its collector connected to the other side of bridge 89 and its emitter to a negative voltage through resistor 93. A positive voltage on line 79, indicating an off condition will turn on transistors 81 and 83 causing current to flow from the positive to the negative voltage in the series circuit comprising transistor 81, bridge 89 and transistor 83. Bridge 89 has one of its remaining terminals connected to ground and the opposite one to line 45 going to the amplifier input. The bridge comprises four diodes 95 which should be matched as closely as possible to provide equal currents through the upper and lower paths and equal voltage drops so that line 45 will also be at ground. A small potentiometer 97 is used to adjust for any unbalance. The bridge has the advantages of speed in switching, no contact bounce, which would be a problem if a relay were used, and no offset voltage, which would be a problem if a transistor switch were used. With an offset at line 45, the amplifier would always be providing some output current. With the bridge the amplifier will truly be off.

A type diode which will work well is a hot carrier diode, a unique combination of both a conventional PN junction and a majority carrier device, the Schottky carrier diodes. These can be purchased matched, have high breakdown voltages, the good temperature characteristics of silicon, the low forward voltage of germanium and the speed of a carrier diode.

Thus a system which assures that voltages are applied to and removed from a deflection amplifier only when at or near zero volts thus preventing overloading and damage to the amplifier has been shown. Although a specific embodiment has been described it will be evident to those skilled in the art that various modifications may be made without departing from the spirit of the invention which is intended to be limited solely by the appended claims.

What is claimed is:

1. Apparatus to cause the scan voltage applied to a deflection amplifier to be turned on and off at or near a zero crossover comprising:

a. a resistor coupling the scan signal to the deflection amplifier;
b. selection means to provide on and off commands;
c. means to sense the scan voltage and to provide an output pulse at zero crossover;
d. means having said output pulse and said on and off commands as inputs and providing a first output level for an on command and a second output level for an off command and adapted to change levels only on occurrence of said output pulse; and
e. means responsive to said output levels and coupled to the amplifier side of said resistor, said means presenting to said resistor an open circuit, when said first output level is present and a ground when said second output level is present.

2. The invention according to claim 1 wherein said responsive means comprises a diode bridge in series between two transistor switches, said switches being responsive to said output levels, one of the remaining bridge terminals being grounded and the last terminal being coupled to said resistor.

3. The invention according to claim 2 wherein said last terminal is coupled to said resistor with a capacitor selected to present an AC short circuit at the frequency of said scan voltage.

4. The invention according to claim 2 and further including a potentiometer placed in series between the diodes whose junction would form said last terminal whereby the wiper of said potentiometer will be said last terminal.

5. The invention according to claim 4 wherein said last terminal is coupled to said resistor with a capacitor selected to present an AC short circuit at the frequency of said scan voltage.

6. The invention according to claim 1 wherein said selection means comprises a single pole double throw switch and a set reset flip flop, the set and reset inputs of said flip flop coupled respectively to the normally open and normally closed contacts of said switch, said flip flop providing a first output which will be high when said switch is in the on position and a second output which will be high when said switch is in the off position.

7. The invention according to claim 6 wherein said means for providing said output levels comprises:

a. a first And gate having said first output of said flip flop and said output pulse as inputs;
b. a second And gate having said second output of said flip flop and said output pulse as inputs; and
c. a second set-reset flip flop having the outputs of said first and second And gates as its set and reset inputs respectively said output levels being provided from an output of said second flip flop.

8. The invention according to claim 7 and further including a transistor inverter coupled to the output of said second flip flop to provide level shifting.

9. The invention according to claim 1 wherein said means to sense and provide said pulse comprises a comparator having one input grounded and said scan voltage as a second input and providing an output when said voltage reaches zero, and a one shot multivibrator having said comparator output as an input.

10. The invention according to claim 9 and further including positive feedback for said comparator whereby it will lock up when zero crossover occurs in the positive direction.

* * * * *